Sept. 9, 1969

M. FASSETT

LIGHT-OPERATED SOUND-SIGNAL TELEPHONE TRANSMITTER AND TRANSMISSION SYSTEM

Filed June 21, 1966

3,466,446

559,325

INVENTOR

MATTHEW FASSETT

BY Fisher & Craig

ATTORNEYS

United States Patent Office 3,466,446
Patented Sept. 9, 1969

3,466,446
LIGHT-OPERATED SOUND-SIGNAL TELEPHONE TRANSMITTER AND TRANSMISSION SYSTEM

Matthew Fassett, Belmont, Mass., assignor to Stromberg-Carlson Corporation, Rochester, N.Y., a corporation of Delaware Filed June 21, 1966, Ser. No. 559,325
Int. Cl. H04b *9/00*
U.S. Cl. 250—199 9 Claims

ABSTRACT OF THE DISCLOSURE

A light-operated sound signal transmission system is provided which is comprised by a light source, a pair of light polarizers and light detecting means all in optical alignment. The light polarizers are rotatably supported by suitable torsion wires having a relatively small diameter. One of the light polarizers is coupled to and driven by a diaphragm for converting sound signals to a vibrating translatory motion which is coupled to a suitable radius lever arm extending from the center of axis of rotation of the light polarizer. As a result of this arrangement, sound energy impinging on the diaphragm causes the light polarizer to be rotated and hereby modulate the light energy transmitted to the light detector in accordance with the sound signal. The torsion wire suspension provides the system with an improved dynamic response.

This invention relates to a light-operated sound signal telephone transmitter and transmission system.

More particularly, the invention relates to a sound signal transmission system wherein the sound energy is used to modulate a polarized light beam by causing relative rotation between a light polarizer and a light analyzer in response to the sound signal to be transmitted.

The telephone transmitter today is a relatively well-developed device in view of the length of time and extent of its service in the voice communication (telephony) field. However, there is always a continuing need to improve the operating characteristics of components in almost every field including that of telephony. The present invention is intended to provide a new and improved telephone transmitter and sound signal transmission system for use in the voice communication field.

Accordingly, it is a primary purpose of the present invention to provide a new and improved telephone transmitter and sound transmission system which is relatively simple, economical, possesses inherent gain in its mode of operation, and has improved dynamic response.

The present invention constitutes an improvement in a light-operated sound signal transmission system which includes a light source, light polarizing and analyzing means, light detector means and means for transmitting light through the light polarizing and analyzing means to the light detector means. The improved feature made available by the present invention comprises diaphragm means for converting sound signals to a vibrating translatory motion, and coupling means intercoupling the diaphragm means to a radius lever arm extending from the center of axis of rotation of the light polarizing and analyzing means for causing relative rotation between the light polarizing and analyzing means. By this arrangement, sound energy impinging on the diaphragm will cause relative rotation between the light polarizing and analyzing means in accordance with the sound signals to thereby modulate the light energy transmitted to the light detector means with the sound signal.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
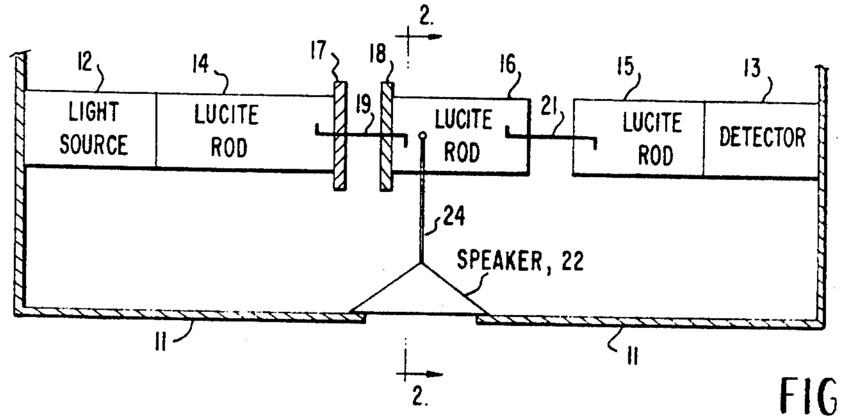
FIGURE 1 is a schematic block diagram of a light-operated sound-signal transmitter constructed in accordance with the present invention.
Figures 1A, 2, 3:
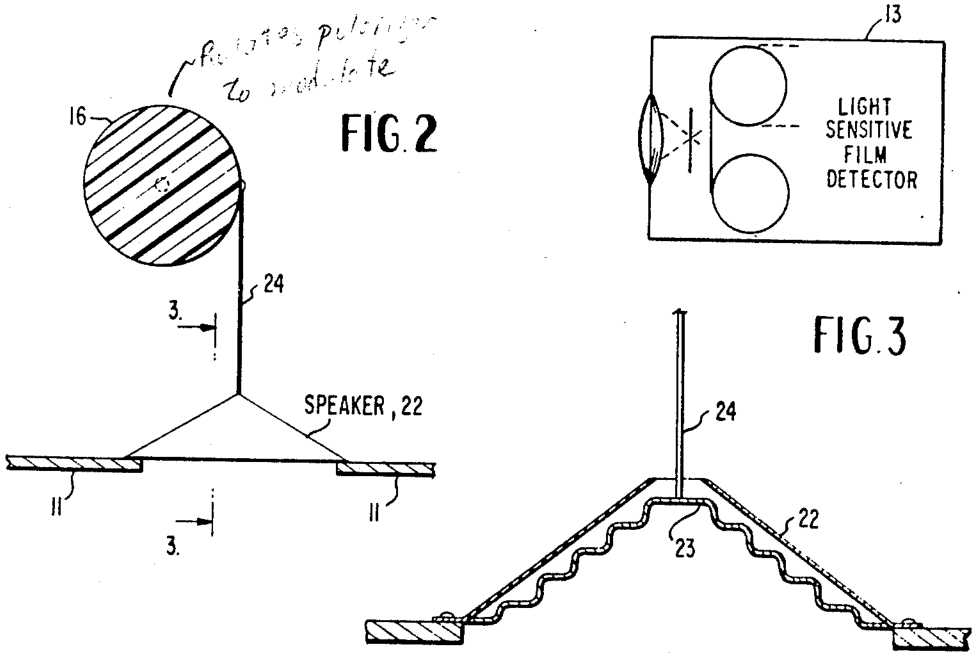
FIGURE 1A is a block diagram of a light sensitive receiver.
FIGURE 2 is a cross-sectional view of the sound-signal transmitter shown in FIGURE 1 taken through plane II—II.
Figure 4:
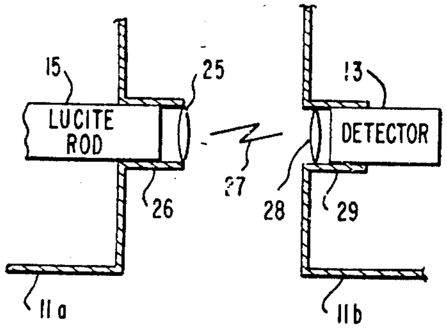

FIGURE 3 is a cross-sectional view of the speaker or sound diaphragm portion of the transmitter shown in FIGURES 1 and 2 taken through plane III—III of FIGURE 2; and FIGURE 4 is a partial schematic diagram of an alternative arrangement of a sound signal transmission system in accordance with the invention, wherein any desired length of the optical path intercoupling the parts of the transmission system may be provided.

FIGURE 1 of the drawings illustrates a new and improved light-operated sound-signal transmitter constructed in accordance with the invention. In FIGURE 1, the transmitter is mounted within a suitable housing member 11, and comprises a light source 12 mounted on one side thereof and a light detector 13 mounted on the other. The light source 12 may comprise any suitable source of high intensity white light, or may comprise a source of monochromatic light such as produced by a ruby maser or one of the commercially available light-emitting diodes. The light detector 13 preferably comprises a commercially available photoelectric cell; however, if desired, a photomultiplier could be employed should the parameters of the system require it. Additionally, for certain applications a photo-sensitive or photo-conductive surface, or a photovoltaic cell could be inserted as the detctor 13.

First and seocnd light pipe means which comprise a first Lucite rod 14 and a second Lucite rod 15 are mounted within housing 11 on the light source 12, and light detector 13, respectively. The Lucite rods 14 and 15 are mounted so that they are in optical alignment with each other and with the light source 12 and light detector 13. While the light pipe means 14 and 15 have been described as preferably comprising Lucite rods, any suitable light coupling assembly could be employed in their place. For example, a suitable arrangement of lenses, hollow glass tubes having internal reflective surfaces, or other fiber optic devices might be employed as the light pipe means. A third light pipe means 16 comprised by a Lucite rod is interposed between the Lucite rod 14 and Lucite rod 15 in optical alignment with each of these elements.

The two confronting ends or surfaces of the Lucite rods 14 and 16 have a light polarizing member 17, and a light analyzing member 18 secured thereto, respectively. The light polalizing and analyzing members 17 and 18 may comprise tourmaline crystals or plates or commercially available pollaroid material which are aligned so as to effect either essentially zero transmission of the light from light source 12 therethrough, or alternatively, to effect maximum transmission of the light. In order to support Lucite rod 16 and its associated light analyzing member 18 in place, torsion wires 19 and 21 are provided. Torsion wires 19 and 21 may comprise any suitable high strength steel wire having a minimum diameter and preferably a darkened surafce so as not to affect light rays passing thereby by reflectance. The torsion wires 19 and 21 are secured at their ends to the respective Lucite rod 15 and its associated light polarizing member 17 and Lucite rod 16 and its associated light analyzing member 18 at the axis of rotation of the light polarizing members 17 and 18. Similarly, torsion wire 21 is connected between the adjacent ends of Lucite rods 16 and 15 at the axis of rotation of Lucite rod 16. By reason of this construction, the Lucite rod 16 and its associated light analyzing member 18 may be rotated about the torsion wires 19 and 21 an axes readily by only the minimum application of energy.

In order to rotate the Lucite rod 16 and analyzing member 18 relative to polarizing member 17, diaphragm means shown at 22 are proivded. The diaphragm means 22 comprises a conventional speaker which has its dynamically movable diaphragm 23, best shown in FIGURE 3 of the drawings, directly connected to a coupling means 24 that may comprise a relatively stiff wire cable or other push-rod arrangement. As best shown in FIGURE 2 of the drawings, the coupling means 24 is tangentially connected to one side of the Lucite rod 16 so as to in effect be connected to a radius level arm extending from the ecnter of axis of rotation of the light polarizing and analyzing means 17 and 18. Hence it can be appreciated that the coupling means 24 will cause relative rotation between the light polarizing member 17 and the light analyzing member 18 in response to sound energy impinging on the diaphragm 23.

In operation, assume that the light polarizing member 17 and light analyzing member 18 are arranged such that in the quiescent position (i.e., with no sound signals impinging on the diaphragm means 22), essentially no light is passed through the light analyzing means to be transmitted to the light detector means 13. With the system thus arranged, upon sound signals impinging upon diaphragm member 23, the coupling rod 24 will cause Lucite rod 16 and hence light analyzer member 18 to be rotated around the torsion wires 19, 21 as axes of rotation. As a consequence of this movement, the plane of polarization of the analyzing member 18 will be rotated sufficiently to allow amounts of light to be transmitted to the detector 13 which are proportional to the magnitude and frequency of the sound waves impinging on the diaphragm means 22 and 23. If desired, the polarizing member 17 and analyzing member 18 could be arranged initially to transmit maximum light in the quiescent condition, in which event, movement of the speaker diaphragm means 23 would still cause modulation of the light reaching detector 13 by decreasing the intensity thereof. The sound modulated electric output signal developed by light detector 13 may then be used to modulate the carrier of a carrier telephony communication system, or it may be transmitted directly to a suitable telephony receiver, etc.

From the foregoing description, however, it can be appreciated that the system is relatively simple and economical. Further, because a relatively high intensity light source 12 can be employed whose output is modulated with the incoming waves by only slight rotation of the polarizing and analyzing member, the system will exhibit a fairly high gain. Additionally, by appropriate design of the Lucite rod and polyarizing members 17 and 18, as well as the coupling member 24 and speaker diaphragm 23, the system can be designed to exhibit good dynamic response to sound waves impinging on the speaker diaphragm 23.

As an alternative to the arrangement described above, the light detector 13 may be designed to comprise a piece of photosensitive film or the like which would form a permanent record of the light rays impinging on it, and hence the sound waves being received. For this purpose, the detector 13 would have the form shown in FIGURE 1A and the film could be in the form of a tape run through the detector area 13 at an appropriate speed to achieve the desired permanent record. With such an arrangement, the apparatus would then comprise a sound exposure meter suitable for use in industrial medicine, for example.

Still another alternative form of practicing the invention is illustrated in FIGURE 4 of the drawings. In FIGURE 4, the housing member 11 is broken up into two parts 11*a* and 11*b*. In the part 11*a*, in place of detector 13, the Lucite rod 15 is mounted on the housing member 11*a*. The Lucite rod 15 is secured in a manner such that its end confronts a suitable lens assembly 25 mounted in an opening 26 in housing part 11*a*. By this arrangement, light emitting from the end of the Lucite rod 15 will be transmitted through the lens assembly 25 and projected over a suitable light path indicated at 27 to a light detector located in the housing part 11*b*. The housing part 11*b* contains the light detector 13 mounted in light-coupled relationship with a receiving lens assembly 28 secured in an opening 29. By this arrangement, it is therefore possible to separate the light detector portion 13 from the remainder of the transmitter mounted within housing part 11*a* so that the optical path 27 may be any desired length. This, of course, allows for remote actuation of the detector 13 relative to the location of the transmitter portion 11*a*.

From the foregoing description, it can be appreciated that the invention provides a new and improved telephone transmitter and sound transmission system which is relatively simple, economical, possesses inherent gain in its mode of operation, and has improved dynamic response.

Having described two embodiments of a light-operated sound-signal transmission system constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

I claim:

1. A light-operated sound-signal transmission system including, in combination, a housing member, a light source secured to said housing member, a pair of light polarizing means, light detector means secured to said housing member, a pair of stationary light pipe means defining a light path between said light source and said light detector means, a rotatable light pipe means positioned between said pair of stationary light pipe means and supported for rotation by torsion wires connected to said stationary light pipe means, said torsion wires having a relatively small dimension compared to the size of said light pipe means, means for mounting one of said polarizing means to one of said stationary light pipe means and in said light path, means for mounting the other one of said polarizing means to said rotatable light pipe means and in said light path, diaphragm means for converting sound signals into a vibrating translatory motion, and coupling means having one end connected to and driven by said diaphragm means and having the remaining end thereof connected to said rotatable light pipe means for causing rotation of said other one of said polarizing means in response to sound energy impinging on the diaphragm to thereby modulate the light energy transmitted to the light detector means with the sound signal.

2. The system set forth in claim 1, wherein the light detector means comprises a photoelectric cell.

3. The system set forth in claim 1, wherein the light detector means comprises a light-sensitive film.

4. The system set forth in claim 1, further characterized by said pair of stationary light pipe means comprise first and second Lucite rods, said first Lucite rod having one end secured to said light source and having a first one of said pair of light polarizing means secured to the remaining end thereof, said second Lucite rod having one end thereof secured to said light detector means and having the remaining free end thereof in optical alignment with the first Lucite rod, said rotatable light pipe means comprises a third Lucite rod having the second one of said pair of polarizing means secured to one end thereof interposed between said first and second Lucite rods in optical alignment therewith to function as an analyzer means, the third Lucite rod and said second polarizing means being supported for rotation about the longitudinal axis of the Lucite rod by said torsion wires secured to each end thereof at the axis of rotation, and said coupling means having one end thereof driven by the diaphragm means and tangentially connected at the other end to the third Lucite rod for rotating said second polarizing means relative to said first polarizing means in response to sound waves impinging on the diaphragm means.

5. The system set forth in claim 4, wherein the light detector means comprises a photoelectric cell.

6. The system set forth in claim 4, wherein the light detector means comprises a light-sensitive film.

7. The system set forth in claim 1, further characterized by a first one of said pair of stationary light pipe means having one end secured to said light source and having a first one of said pair of light polarizing means secured to the remaining end thereof, a second one of said pair of stationary light pipe means having one end thereof secured to said housing member and being in optical alignment with said first light pipe means and with a suitable lens assembly for projecting a light beam signal over said light path, said rotatable light pipe means having the second one of said pair of polarizing means secured to one end thereof interposed between said first and second light pipe means in optical alignment therewith to function as an analyzer means, the rotatable light pipe means and said second polarizing means being supported for rotation about the longitudinal axis of the third light pipe means by said torsion wires secured to each end thereof at the axis for rotation, and said coupling means having one end thereof driven by the diaphragm means and tangentially connected at the other end to the rotatable light pipe means for rotating said second polarizing means relative to said first polarizing means in response to sound waves impinging on the diaphragm means, and light detector means disposed in the optical path of the light beam projected by the lens assembly for receiving and recovering the modulated light beam signal.

8. The system set forth in claim 7, wherein the light detector means comprises a photoelectric cell.

9. The system set forth in claim 7, wherein the light detector means comprises a photo-sensitive film.

References Cited

UNITED STATES PATENTS

| | | | |
|---|---|---|---|
| 1,997,628 | 4/1935 | Chubb | 250—199 |
| 2,254,022 | 8/1941 | Whitaker | 350—159 X |
| 2,345,445 | 3/1944 | Atwood | 250—199 |
| 2,376,493 | 5/1945 | Land et al. | 350—159 X |
| 2,951,736 | 9/1960 | Black | 350—96 X |
| 3,036,153 | 5/1962 | Day | 350—96 X |

ROBERT L. GRIFFIN, Primary Examiner

ALBERT J. MAYER, Assistant Examiner

U.S. Cl. X.R.

350—159